(12) United States Patent
Camp et al.

(10) Patent No.: US 9,990,279 B2
(45) Date of Patent: Jun. 5, 2018

(54) PAGE-LEVEL HEALTH EQUALIZATION

(71) Applicant: International Business Machines Corporation, Armonk, NY (US)

(72) Inventors: Charles J. Camp, Sugar Land, TX (US); Thomas Mittelholzer, Zurich (CH); Nikolaos Papandreou, Thalwil (CH); Thomas Parnell, Zurich (CH); Charalampos Pozidis, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 14/581,963

(22) Filed: Dec. 23, 2014

(65) Prior Publication Data

US 2016/0179664 A1    Jun. 23, 2016

(51) Int. Cl.
*G06F 12/02* (2006.01)
*G06F 11/10* (2006.01)

(52) U.S. Cl.
CPC ........ *G06F 12/0246* (2013.01); *G06F 11/108* (2013.01); *G06F 2212/7201* (2013.01); *G06F 2212/7205* (2013.01)

(58) Field of Classification Search
None
See application file for complete search history.

(56) References Cited

U.S. PATENT DOCUMENTS

| | | |
|---|---|---|
| 5,490,110 A | 2/1996 | Sawada et al. |
| 5,559,956 A | 9/1996 | Sukegawa |
| 5,673,383 A | 9/1997 | Sukegawa |
| 5,832,493 A | 11/1998 | Marshall et al. |
| 5,905,993 A | 5/1999 | Shinohara |
| 6,259,627 B1 | 7/2001 | Wong |
| 6,553,104 B1 | 4/2003 | Haefliger |
| 6,996,692 B2 | 2/2006 | Kouno |
| 7,424,666 B2 | 9/2008 | Chandwani et al. |

(Continued)

FOREIGN PATENT DOCUMENTS

| | | |
|---|---|---|
| CN | 101325089 A | 12/2008 |
| EP | 1008936 A2 | 6/2000 |

(Continued)

OTHER PUBLICATIONS

Non-Final Office Action from U.S. Appl. No. 14/520,276, dated Mar. 29, 2016.

(Continued)

*Primary Examiner* — Tracy Chan
(74) *Attorney, Agent, or Firm* — Zilka-Kotab, P.C.

(57) ABSTRACT

According to one embodiment, a method includes assigning a subset of physical pages within a block of non-volatile memory to a pseudo-physical block, wherein a number of pages in the pseudo-physical block is less than a number of physical pages within the non-volatile memory block, and reassigning physical pages within the block of non-volatile memory to the pseudo-physical block upon occurrence of an event. The assigning includes: determining a health metric for each of the physical pages within the block of non-volatile memory, and selecting a subset of the physical pages for assignment to the pseudo-physical block based on the health metric. Moreover, the subset of pages has a fixed size for at least a number of reassignments.

19 Claims, 9 Drawing Sheets

(56) References Cited

U.S. PATENT DOCUMENTS

| | | | |
|---|---|---|---|
| 7,542,344 B2 | 6/2009 | Kim | |
| 7,545,677 B2 | 6/2009 | Lee et al. | |
| 7,649,782 B2 | 1/2010 | Eguchi et al. | |
| 7,808,836 B2 | 10/2010 | Murin et al. | |
| 7,986,560 B2 | 7/2011 | Park et al. | |
| 8,116,141 B2 | 2/2012 | Yoo et al. | |
| 8,281,220 B2 | 10/2012 | Kitahara | |
| 8,296,620 B2 | 10/2012 | Chen et al. | |
| 8,356,216 B2 | 1/2013 | Radke et al. | |
| 8,447,919 B1* | 5/2013 | Agarwal | G06F 12/0246 711/103 |
| 8,463,983 B2 | 6/2013 | Eleftheriou et al. | |
| 8,527,819 B2 | 9/2013 | Shalvi et al. | |
| 8,555,109 B2 | 10/2013 | Dhuse et al. | |
| 8,601,313 B1* | 12/2013 | Horn | G06F 11/3034 714/6.32 |
| 8,687,421 B2 | 4/2014 | Avila et al. | |
| 8,938,659 B2 | 1/2015 | Wu et al. | |
| 9,075,705 B2 | 7/2015 | Hikichi | |
| 9,558,107 B2 | 1/2017 | Camp et al. | |
| 9,639,462 B2 | 5/2017 | Camp et al. | |
| 2004/0083335 A1 | 4/2004 | Gonzalez et al. | |
| 2005/0093571 A1 | 5/2005 | Suaris et al. | |
| 2005/0190615 A1 | 9/2005 | Linde et al. | |
| 2005/0264910 A1 | 12/2005 | Lee | |
| 2006/0200299 A1 | 9/2006 | Torno et al. | |
| 2007/0180328 A1 | 8/2007 | Cornwell et al. | |
| 2008/0123419 A1 | 5/2008 | Brandman et al. | |
| 2008/0192544 A1 | 8/2008 | Berman et al. | |
| 2009/0003073 A1 | 1/2009 | Rizel et al. | |
| 2009/0003703 A1 | 1/2009 | Zhang et al. | |
| 2009/0070654 A1 | 3/2009 | Flachs et al. | |
| 2009/0141563 A1 | 6/2009 | Furnemont | |
| 2009/0323412 A1 | 12/2009 | Mokhlesi et al. | |
| 2009/0323423 A1 | 12/2009 | Bloom et al. | |
| 2010/0046302 A1 | 2/2010 | Ogura et al. | |
| 2010/0064096 A1 | 3/2010 | Weingarten et al. | |
| 2010/0251075 A1 | 9/2010 | Takahashi et al. | |
| 2010/0257429 A1 | 10/2010 | Noguchi | |
| 2011/0041039 A1* | 2/2011 | Harari | G06F 11/1068 714/773 |
| 2011/0131367 A1 | 6/2011 | Park et al. | |
| 2011/0238890 A1 | 9/2011 | Sukegawa | |
| 2012/0047409 A1 | 2/2012 | Post et al. | |
| 2012/0066441 A1 | 3/2012 | Weingarten | |
| 2012/0198128 A1 | 8/2012 | Van Aken | |
| 2012/0216085 A1 | 8/2012 | Weingarten et al. | |
| 2012/0226963 A1 | 9/2012 | Bivens et al. | |
| 2012/0239858 A1 | 9/2012 | Melik-Martirosian | |
| 2012/0239991 A1 | 9/2012 | Melik-Martirosian | |
| 2012/0246540 A1 | 9/2012 | Lee et al. | |
| 2012/0250415 A1 | 10/2012 | Sharon et al. | |
| 2012/0278651 A1 | 11/2012 | Muralimanohar et al. | |
| 2012/0284587 A1 | 11/2012 | Yu et al. | |
| 2012/0304039 A1 | 11/2012 | Peterson et al. | |
| 2012/0311271 A1 | 12/2012 | Klein et al. | |
| 2012/0324299 A1 | 12/2012 | Moshayedi | |
| 2012/0331207 A1 | 12/2012 | Lassa et al. | |
| 2013/0073786 A1 | 3/2013 | Belgal et al. | |
| 2013/0094286 A1 | 4/2013 | Sridharan et al. | |
| 2013/0111298 A1 | 5/2013 | Seroff et al. | |
| 2013/0124787 A1 | 5/2013 | Schuette | |
| 2013/0124931 A1 | 5/2013 | Chen | |
| 2013/0145079 A1 | 6/2013 | Lee et al. | |
| 2013/0166827 A1 | 6/2013 | Cideciyan et al. | |
| 2013/0194865 A1 | 8/2013 | Bandic et al. | |
| 2013/0215682 A1 | 8/2013 | Yang | |
| 2013/0227200 A1 | 8/2013 | Cometti et al. | |
| 2013/0294184 A1 | 11/2013 | Yang et al. | |
| 2013/0297988 A1 | 11/2013 | Wu et al. | |
| 2013/0339574 A1 | 12/2013 | Franceschini et al. | |
| 2013/0343129 A1 | 12/2013 | Wakchaure et al. | |
| 2014/0006694 A1 | 1/2014 | Seo et al. | |
| 2014/0029336 A1 | 1/2014 | Venkitachalam et al. | |
| 2014/0040664 A1 | 2/2014 | Hida et al. | |
| 2014/0040681 A1 | 2/2014 | Wolfman et al. | |
| 2014/0059405 A1 | 2/2014 | Syu et al. | |
| 2014/0082440 A1 | 3/2014 | Ho et al. | |
| 2014/0089564 A1 | 3/2014 | Liu et al. | |
| 2014/0095110 A1 | 4/2014 | Chen et al. | |
| 2014/0101490 A1 | 4/2014 | Cronin et al. | |
| 2014/0115238 A1* | 4/2014 | Xi | G06F 12/12 711/103 |
| 2014/0126292 A1 | 5/2014 | Yang et al. | |
| 2014/0136927 A1 | 5/2014 | Li et al. | |
| 2014/0204672 A1* | 7/2014 | Lee | G11C 16/16 365/185.12 |
| 2014/0208004 A1 | 7/2014 | Cohen et al. | |
| 2014/0208041 A1 | 7/2014 | Hyde et al. | |
| 2014/0208174 A1 | 7/2014 | Ellis et al. | |
| 2014/0226398 A1 | 8/2014 | Desireddi et al. | |
| 2014/0334228 A1 | 11/2014 | Kim et al. | |
| 2015/0103593 A1 | 4/2015 | Su | |
| 2015/0154061 A1 | 6/2015 | Camp et al. | |
| 2015/0161034 A1 | 6/2015 | Fisher | |
| 2015/0161035 A1 | 6/2015 | Fisher et al. | |
| 2015/0161036 A1 | 6/2015 | Camp et al. | |
| 2015/0169468 A1 | 6/2015 | Camp et al. | |
| 2015/0170746 A1 | 6/2015 | Oowada et al. | |
| 2015/0177995 A1 | 6/2015 | Camp et al. | |
| 2015/0243363 A1 | 8/2015 | Wu et al. | |
| 2015/0262712 A1 | 9/2015 | Chen et al. | |
| 2016/0110124 A1 | 4/2016 | Camp et al. | |
| 2016/0110248 A1 | 4/2016 | Camp et al. | |
| 2016/0179412 A1 | 6/2016 | Camp et al. | |

FOREIGN PATENT DOCUMENTS

| | | |
|---|---|---|
| JP | H05282880 A | 10/1993 |
| JP | 5203049 B2 | 6/2013 |
| KR | 20130078061 A | 8/2013 |
| WO | 2009072100 A2 | 6/2009 |
| WO | 2009114618 | 9/2009 |

OTHER PUBLICATIONS

Non-Final Office Action from U.S. Appl. No. 14/139,925, dated Jan. 4, 2016.

Non-Final Office Action from U.S. Appl. No. 14/520,034, dated May 6, 2016.

Final Office Action from U.S. Appl. No. 14/139,925, dated May 20, 2016.

Wong et al., "Phase Change Memory," Proceedings of the IEEE, vol. 98, No. 12, Nov. 2012, pp. 2201-2227.

Ricco et al., "Nonvolatile Multilevel Memories for Digital Applications," Proceedings of the IEEE, vol. 86, No. 12, Dec. 1998, pp. 2399-2423.

Chien et al., "A Multi-Level 40nm WOx Resistive Memory with Excellent Reliability," Electron Devices Meeting (IEDM) 2011 IEEE International, Dec. 5-7, 2011, pp. 31.5.1-31.5.4.

Camp et al., U.S. Appl. No. 14/500,900, filed Oct. 21, 2014.

Notice of Allowance from U.S. Appl. No. 14/500,900, dated Sep. 22, 2015.

Camp et al., U.S. Appl. No. 14/520,276, filed Oct. 21, 2014.

Camp et al., U.S. Appl. No. 14/581,976, filed Dec. 23, 2014.

Camp et al., U.S. Appl. No. 14/139,925, filed Dec. 24, 2013.

Non-Final Office Action from U.S. Appl. No. 14/139,925, dated Jul. 8, 2015.

International Search Report and Written Opinion from PCT Application No. PCT/JP2014/005371, dated Dec. 16, 2014.

Camp et al., U.S. Appl. No. 14/520,034, filed Oct. 21, 2014.

Camp et al., U.S. Appl. No. 14/568,178, filed Dec. 12, 2014.

Anonymous, "Method of combined data retention and wear leveling scan for minimizing flash resource contention in flash based memory systems," IP.com Electronic Publication, Aug. 10, 2013, pp. 1-3.

Cai et al., "Threshold Voltage Distribution in MLC NAND Flash Memory: Characterization, Analysis, and Modeling," European Design and Automation Association, Mar. 2013, pp. 1-6.

(56) References Cited

OTHER PUBLICATIONS

Chang et al., "Endurance Enhancement of Flash-Memory Storage Systems: An Efcient Static Wear Leveling Design," 44th ACM/IEEE Design Automation Conference, Jun. 4-8, 2007, pp. 212-217.
Chang et al., "A Low-Cost Wear-Leveling Algorithm for Block-Mapping Solid-State Disks," ACM SIGPLAN/SIGBED Conference on Languages, Compilers, Tools and Theory for Embedded Systems, Apr. 11-14, 2011, pp. 31-40.
Chang, Li-Pin, "On Efficient Wear Leveling for Large-Scale Flash-Memory Storage Systems," Proceedings of the 2007 ACM symposium on Applied computing, Mar. 11-15, 2007, 5 pages.
Chen et al., "Bias-induced oxygen adsorption in zinc tin oxide thin film transistors under dynamic stress," Applied Physics Letters 96, No. 26, Jun. 2010, pp. 262104-1-262104-3.
Cho et al., "NAND Reliability Improvement with Controller Assisted Algorithms in SSD," Flash Memory Summit, Santa Clara, CA, Aug. 2013, pp. 1-18.
Choi et al., "Wear Leveling for PCM Using Hot Data Identification." Proceedings of the International Conference on IT Convergence and Security 2011, Dec. 7, 2011, 2 pages.
Dong et al., "Using Lifetime-Aware Progressive Programming to Improve SLC NAND Flash Memory Write Endurance," IEEE, Jul. 3, 2013, pp. 1270-1280.
Frickey, R., "Data Integrity on 20nm SSDs," Flash Memory Summit, Aug. 2012, pp. 1-24.
Gregori et al., "On-Chip Error Correcting Techniques for New-Generation Flash Memories," Proceedings of the IEEE, vol. 91, Issue 4, Apr. 2003, pp. 602-616.
Grupp et al., "Characterizing Flash Memory: Anomalies, Observations, and Applications," IEEE/ACM International Symposium on Microarchitecture, Dec. 12-16, 2009, 10 pages.
Hsieh et al., "Efficient Identification of Hot Data for Flash Memory Storage Systems," ACM Transactions on Storage, vol. 2, No. 1, Feb. 2006, pp. 22-40.
Hu et al., "Container Marking: Combining Data Placement, Garbage Collection and Wear Levelling for Flash," IEEE, Jul. 25-27, 2011, pp. 237-247.
Huang et al., "An Aggressive Worn-out Flash Block Management Scheme to Alleviate SSD Performance Degradation," Eurosys'14, Apr. 14-16, 2014, 14 pages.
Hutsell et al., "Flash Solid-State Disk Reliability," Texas Memory Systems, Nov. 2008, pp. 1-16.
Hutsell, W., "An In-depth Look at the RamSan-500 Cached Flash Solid State Disk," Texas Memory Systems, Mar. 2008, pp. 1-14.
Hutsell, W., "An In-depth Look at the RamSan-620 Flash Solid State Disk," Texas Memory Systems, Jul. 2009, pp. 1-16.
Jung et al., "A Group-Based Wear-Leveling Algorithm for Large-Capacity Flash Memory Storage Systems," Proceedings of the 2007 International Conference on Compilers, architecture, and synthesis for embedded systems, Sep. 30-Oct. 3, 2007, pp. 160-164.
Micheloni et al., "Non-volatile memories for removable media," Proceedings of the IEEE, vol. 97, No. 1, Jan. 2009, pp. 148-160.
Prince, B., "After DRAM—Some Novel Contenders," Emerging Memories: Technologies and Trends, Feb. 28, 2002, pp. 181-233.
Qureshi et al., "Enhancing Lifetime and Security of PCM-Based Main Memory with Start-Gap Wear Leveling," 42nd Annual IEEE/ACM International Symposium on Microarchitecture, Dec. 12-16, 2009, pp. 14-23.
Schmidt et al., "Heavy Ion SEE Studies on 4-Gbit NAND-Flash Memories," IEEE, Sep. 10-14, 2007, pp. 1-4.
Silverton Consulting, Inc., "IBM FlashSystem 840 RAS for better performance and data protection," StorInt Briefling, Jun. 2012, pp. 1-7.
Non-Final Office Action from U.S. Appl. No. 141581,976, dated Apr. 11, 2016.
List of IBM Patents or Patent Applications Treated as Related.
Non-Final Office Action from U.S. Appl. No. 14/581,976, dated Dec. 21, 2016.
Notice of Allowance from U.S. Appl. No. 14/568,178, dated Dec. 23, 2016.
Notice of Allowance from U.S. Appl. No. 14/568,178, dated Sep. 12, 2016.
Jimenez et al., "Wear Unleveling: Improving NAND Flash Lifetime by Balancing Page Endurance," 12th USENIX Conference on File and Storage Technologies, Feb. 17-20, 2014, pp. 47-59.
Notice of Allowance from U.S. Appl. No. 14/520,276, dated Sep. 15, 2016.
Notice of Allowance from U.S. Appl. No. 14/139,925, dated Sep. 16, 2016.
Supplemental Notice of Allowance from U.S. Appl. No. 14/520,276, dated Oct. 20, 2016.
Non-Final Office Action from U.S. Appl. No. 14/520,034, dated Oct. 27, 2016.
Final Office Action from U.S. Appl. No. 14/520,034, dated Apr. 24, 2017.
Non-Final Office Action from U.S. Appl. No. 14/581,976, dated Jul. 28, 2017.
Examiner's Answer to Appeal Brief from U.S. Appl. No. 14/520,034, dated Jan. 3, 2018.

* cited by examiner

PAGE-LEVEL HEALTH EQUALIZATION

BACKGROUND

The present invention relates to non-volatile random access memory, such as NAND Flash memory, and more particularly, this invention relates to dynamic logical block assignment for achieving page-level health equalization.

Using Flash memory as an example, the performance characteristics of conventional NAND Flash-based solid state drives (SSDs) are fundamentally different from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations.

However, in Flash-based SSDs, memory locations are erased in blocks prior to being written to. The size of a minimal erase unit (a block) is typically 256 pages and the erase operations takes approximately one order of magnitude more time than a page program operation. Due to the intrinsic properties of NAND Flash, Flash-based SSDs write data out-of-place whereby a mapping table maps logical addresses of the written data to physical ones. This mapping table is typically referred to as the Logical-to-Physical Table (LPT).

As Flash-based memory cells exhibit read errors and/or failures due to wear or other reasons, additional redundancy may be used within memory pages as well as across memory chips (e.g., RAID-5 and RAID-6 like schemes). The additional redundancy within memory pages may include error correction code (ECC) which, for example, may include BCH codes. While the addition of ECC in pages is relatively straightforward, the organization of memory blocks into RAID-like stripes is more complex. For instance, individual blocks are retired over time which requires either reorganization of the stripes, or capacity reduction of the stripe. As the organization of stripes together with the LPT defines the placement of data, SSDs typically utilize a Log-Structured Array (LSA) architecture, which combines these two methods.

The LSA architecture relies on out-of-place writes. In this approach, a memory page overwrite will result in writing the memory page data to a new location in memory, marking the old copy of the memory page data as invalid, and then updating the mapping information. Due to the limitations of current NAND memory technology, an invalidated data location cannot be reused until the entire block it belongs to has been erased. Before erasing, though, the block undergoes garbage collection, whereby any valid data in the block is relocated to a new block. Garbage collection of a block is typically deferred for as long as possible to maximize the amount of invalidated data in block, and thus reduce the number of valid pages that are relocated, as relocating data causes additional write operations, and thereby increases write amplification.

BRIEF SUMMARY

A method, according to one embodiment, includes assigning a subset of physical pages within a block of non-volatile memory to a pseudo-physical block, wherein a number of pages in the pseudo-physical block is less than a number of physical pages within the non-volatile memory block, and reassigning physical pages within the block of non-volatile memory to the pseudo-physical block upon occurrence of an event. The assigning includes: determining a health metric for each of the physical pages within the block of non-volatile memory, and selecting a subset of the physical pages for assignment to the pseudo-physical block based on the health metric. Moreover, the subset of pages has a fixed size for at least a number of reassignments.

An apparatus, according to another embodiment, includes non-volatile memory configured to store data, and a controller and logic integrated with and/or executable by the controller, the logic being configured to: assign a subset of physical pages within a block of the non-volatile memory to a pseudo-physical block, wherein a number of pages in the pseudo-physical block is less than a number of physical pages within the block of non-volatile memory, and reassign physical pages within the block of non-volatile memory to the pseudo-physical block upon occurrence of an event. The assigning includes: determine a health metric for each of the physical pages within the block of non-volatile memory, and select a subset of the physical pages for assignment to the pseudo-physical block based on the health metric. Moreover, the subset of pages has a fixed size for at least a number of reassignments.

A computer program product, according to yet another embodiment, includes a computer readable storage medium having program instructions embodied therewith, the program instructions readable and/or executable by a controller to cause the controller to: assign, by the controller, a subset of physical pages within a block of non-volatile memory to a pseudo-physical block, wherein a number of pages in the pseudo-physical block is less than a number of physical pages within the non-volatile memory block, and reassign, by the controller, physical pages within the block of non-volatile memory to the pseudo-physical block upon occurrence of an event. The assigning includes: determine a health metric for each of the physical pages within the block of non-volatile memory, and select a subset of the physical pages for assignment to the pseudo-physical block based on the health metric. Moreover, the subset of pages has a fixed size for at least a number of reassignments.

Other aspects and embodiments of the present invention will become apparent from the following detailed description, which, when taken in conjunction with the drawings, illustrate by way of example the principles of the invention.

DETAILED DESCRIPTION

Figure 1:
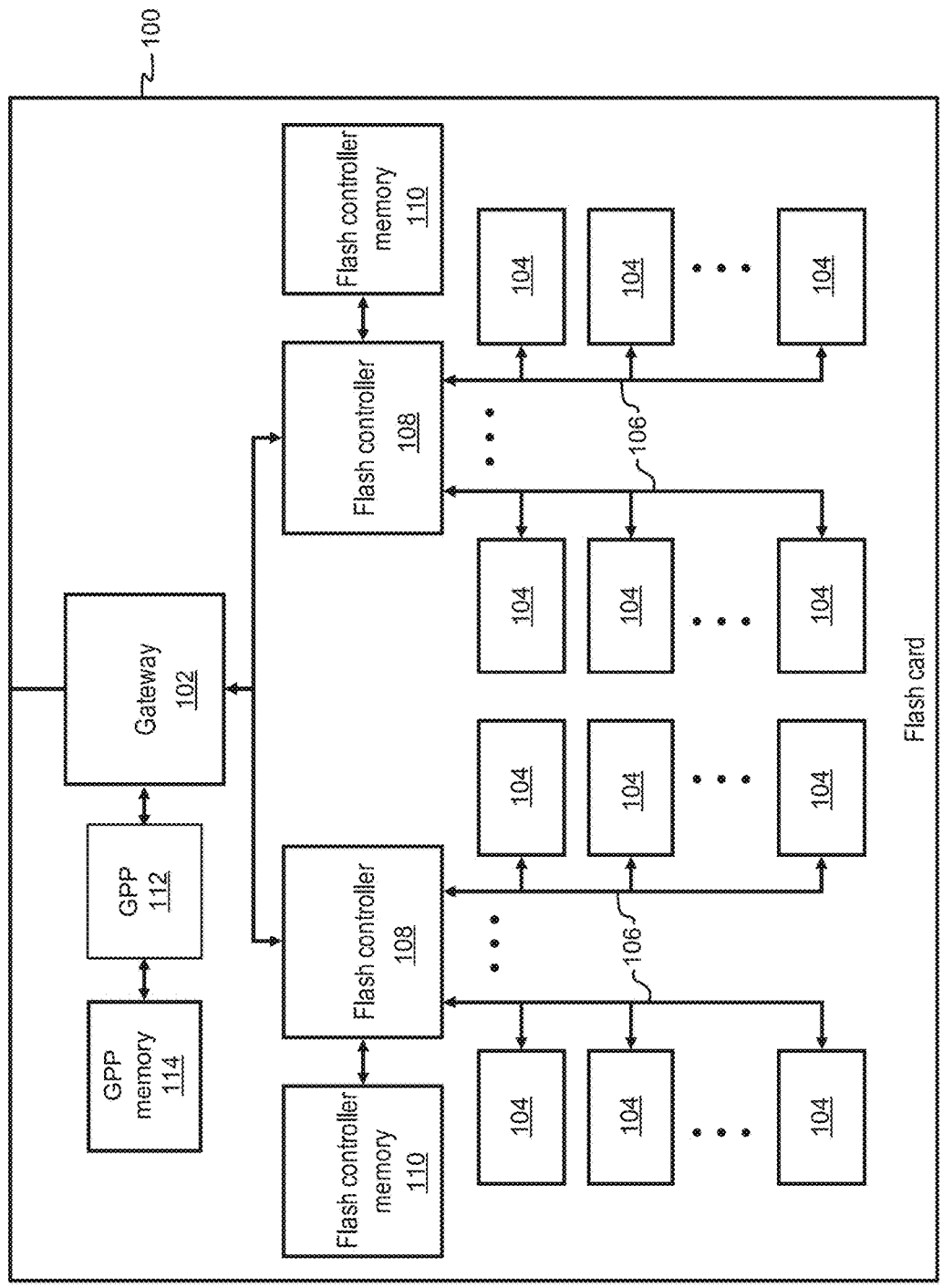
FIG. 1 is a diagram of a non-volatile memory card, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, as used herein, the term "about" with reference to some stated value may refer to the stated value ±10% of said value.

The following description discloses several preferred embodiments of data storage systems, as well as operation and/or component parts thereof. Various embodiments described herein are able to implement dynamic logical block assignment for achieving page-level health equalization, as will be described in further detail below.

It should be appreciated that various embodiments herein can be implemented with a wide range of memory mediums, including for example non-volatile random access memory (NVRAM) technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

In one general embodiment, a method includes assigning a subset of physical pages within a block of non-volatile memory to a pseudo-physical block, wherein a number of pages in the pseudo-physical block is less than a number of physical pages within the non-volatile memory block, and reassigning physical pages within the block of non-volatile memory to the pseudo-physical block upon occurrence of an event. The assigning includes: determining a health metric for each of the physical pages within the block of non-volatile memory, and selecting a subset of the physical pages for assignment to the pseudo-physical block based on the health metric. Moreover, the subset of pages has a fixed size for at least a number of reassignments.

In another general embodiment, an apparatus includes non-volatile memory configured to store data, and a controller and logic integrated with and/or executable by the controller, the logic being configured to: assign a subset of physical pages within a block of the non-volatile memory to a pseudo-physical block, wherein a number of pages in the pseudo-physical block is less than a number of physical pages within the block of non-volatile memory, and reassign physical pages within the block of non-volatile memory to the pseudo-physical block upon occurrence of an event. The assigning includes: determine a health metric for each of the physical pages within the block of non-volatile memory, and select a subset of the physical pages for assignment to the pseudo-physical block based on the health metric. Moreover, the subset of pages has a fixed size for at least a number of reassignments.

In yet another general embodiment, a computer program product includes a computer readable storage medium having program instructions embodied therewith, the program instructions readable and/or executable by a controller to cause the controller to: assign, by the controller, a subset of physical pages within a block of non-volatile memory to a pseudo-physical block, wherein a number of pages in the pseudo-physical block is less than a number of physical pages within the non-volatile memory block, and reassign, by the controller, physical pages within the block of non-volatile memory to the pseudo-physical block upon occurrence of an event. The assigning includes: determine a health metric for each of the physical pages within the block of non-volatile memory, and select a subset of the physical pages for assignment to the pseudo-physical block based on the health metric. Moreover, the subset of pages has a fixed size for at least a number of reassignments.

FIG. 1 illustrates a memory card 100, in accordance with one embodiment. It should be noted that although memory card 100 is depicted as an exemplary non-volatile data storage card in the present embodiment, various other types of non-volatile data storage cards may be used in a data storage system according to alternate embodiments. It follows that the architecture and/or components of memory card 100 are in no way intended to limit the invention, but rather have been presented as a non-limiting example.

Moreover, as an option, the present memory card 100 may be implemented in conjunction with features from any other embodiment listed herein, such as those described with reference to the other FIGS. However, such memory card 100 and others presented herein may be used in various applications and/or in permutations which may or may not be specifically described in the illustrative embodiments listed herein. Further, the memory card 100 presented herein may be used in any desired environment.

With continued reference to FIG. 1, memory card 100 includes a gateway 102, a general purpose processor (GPP) 112 (such as an ASIC, FPGA, CPU, etc.) connected to a GPP memory 114 (which may comprise RAM, ROM, battery-backed DRAM, phase-change memory PC-RAM, MRAM, STT-MRAM, etc., or a combination thereof), and a number of memory controllers 108, which include Flash controllers in the present example. Each memory controller 108 is connected to a plurality of NVRAM memory modules 104 (which may comprise NAND Flash or other non-volatile memory type(s) such as those listed above) via channels 106.

According to various embodiments, one or more of the controllers 108 may be or include one or more processors, and/or any logic for controlling any subsystem of the memory card 100. For example, the controllers 108 typically control the functions of NVRAM memory modules 104 such as, data writing, data recirculation, data reading, etc. The controllers 108 may operate using logic known in the art, as well as any logic disclosed herein, and thus may be considered as a processor for any of the descriptions of non-volatile memory included herein, in various embodiments.

Moreover, the controller 108 may be configured and/or programmable to perform or control some or all of the methodology presented herein. Thus, the controller 108 may be considered to be configured to perform various operations by way of logic programmed into one or more chips, modules, and/or blocks; software, firmware, and/or other instructions being available to one or more processors; etc., and combinations thereof.

Referring still to FIG. 1, each memory controller 108 is also connected to a controller memory 110 which preferably includes a cache which replicates a non-volatile memory structure according to the various embodiments described herein. However, depending on the desired embodiment, the controller memory 110 may be battery-backed DRAM, phase-change memory PC-RAM, MRAM, STT-MRAM, etc., or a combination thereof.

Figure 2:
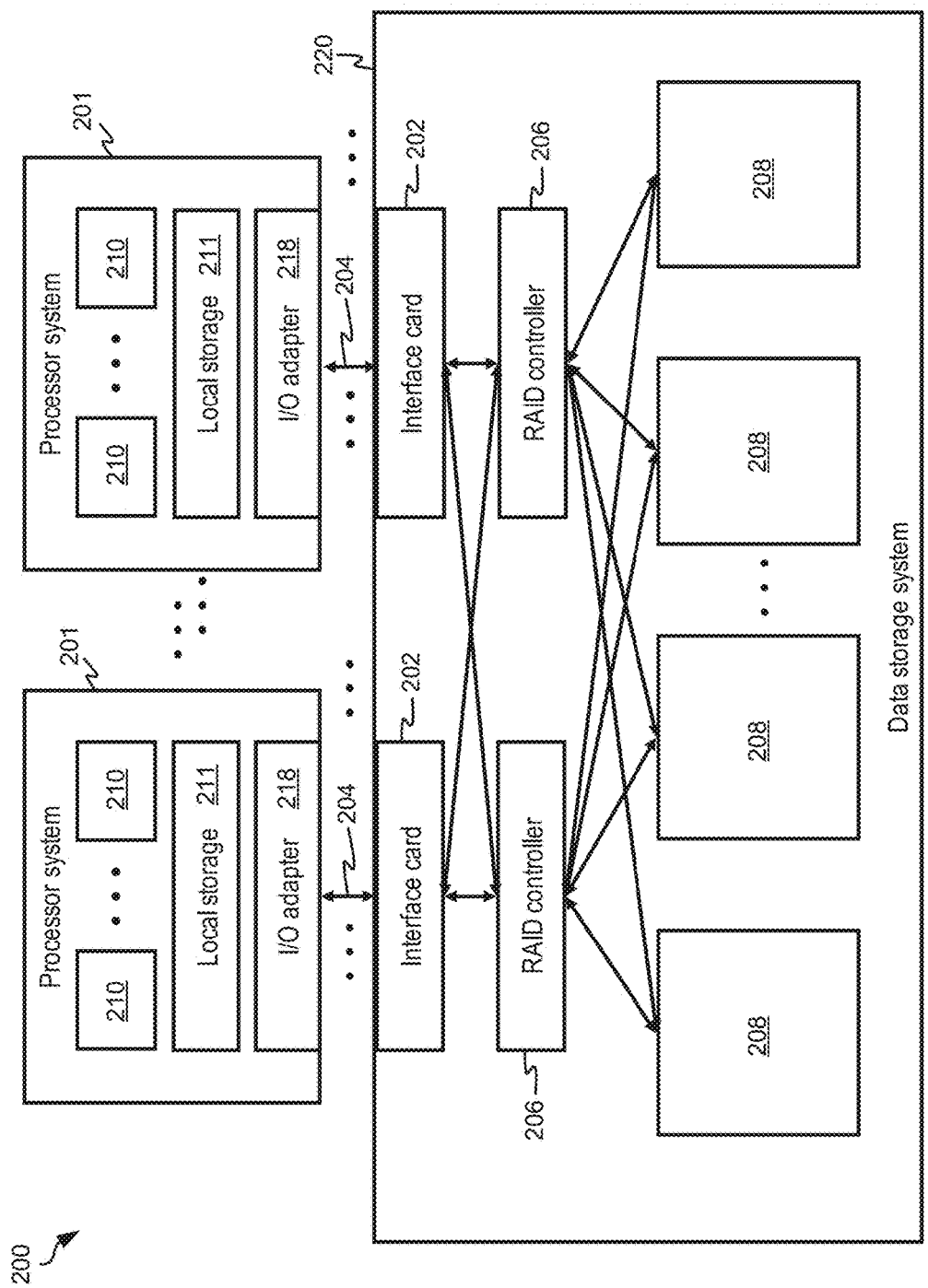
FIG. 2 shows a data storage system architecture, in accordance with one embodiment.

As previously mentioned, memory card 100 may be implemented in various types of data storage systems, depending on the desired embodiment. FIG. 2 illustrates a data storage system architecture 200 according to an exemplary embodiment which is in no way intended to limit the invention. Moreover, it should be noted that the data storage system 220 of FIG. 2 may include various components found in the embodiment of FIG. 1.

Looking to FIG. 2, the data storage system 220 comprises a number of interface cards 202 configured to communicate via I/O interconnections 204 to one or more processor systems 201. The data storage system 220 may also comprise one or more RAID controllers 206 configured to control data storage in a plurality of non-volatile data storage cards 208. The non-volatile data storage cards 208 may comprise NVRAM, Flash memory cards, RAM, ROM, and/or some other known type of non-volatile memory.

The I/O interconnections 204 may include any known communication protocols, such as Fiber Channel (FC), FC over Ethernet (FCoE). Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 206 in the data storage system 220 may perform a parity scheme similar to that employed by RAID-5, RAID-10, or some other suitable parity scheme, as would be understood by one of skill in the art upon reading the present descriptions.

Each processor system 201 comprises one or more processors 210 (such as CPUs, microprocessors, etc.), local data storage 211 (e.g., such as RAM 914 of FIG. 9, ROM 916 of FIG. 9, etc.), and an I/O adapter 218 configured to communicate with the data storage system 220.

Referring again to FIG. 1, memory controllers 108 and/or other controllers described herein (e.g., RAID controllers 206 of FIG. 2) may be able to perform various functions on stored data, depending on the desired embodiment. Specifically, memory controllers may include logic configured to perform any one or more of the following functions, which are in no way intended to be an exclusive list. In other words, depending on the desired embodiment, logic of a storage system may be configured to perform additional or alternative functions, as would be appreciated by one skilled in the art upon reading the present description.

Garbage Collection

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, block-stripes may be identified for being reclaimed and/or relocated.

The unit of the garbage collection operation is also referred to herein as the Logical Erase Block (LEB). It should also be noted that an LEB include any multiple of the physical memory block, which is a unit of physical erasure. Moreover, the organization of memory blocks into LEBs allows for adding RAID-like parity protection schemes among memory blocks from different memory chips, memory planes and/or channels as well as significantly enhancing performance through higher parallelism.

According to an exemplary embodiment, which is in no way intended to limit the invention, memory controllers (e.g., see 108 of FIG. 1) may internally perform a garbage collection. As previously mentioned, the garbage collection may include selecting a block-stripe to be relocated, after which all data that is still valid on the selected block stripe may be relocated (e.g., moved). After the still valid data has been relocated, the entire block-stripe may be erased and thereafter, used for storing new data. The amount of data relocated from the garbage collected block-stripe determines the write amplification. Moreover, an efficient way to reduce the write amplification includes implementing heat segregation.

Heat Segregation

In the present context, the "heat" of data refers to the rate (e.g., frequency) at which the data is updated (e.g., rewritten with new data). Memory blocks that are considered "hot" tend to have a frequent updated rate, while memory blocks that are considered "cold" have an update rate slower than hot blocks.

It should be noted that the number of read requests to and/or read operations performed on a memory block may not come into play when determining the heat of the memory block for some embodiments. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar heat values, heat segregation may be achieved. In particular, heat segregating methods may group hot memory pages together in certain memory blocks while cold memory pages are grouped together in separate memory blocks. Thus, a heat segregated LEB tends to be occupied by either hot or cold data.

The merit of heat segregation is two-fold. First, performing a garbage collection process on a hot memory block will prevent triggering the relocation of cold data as well. In the absence of heat segregation, updates to hot data, which are performed frequently, also results in the undesirable relocations of all cold data collocated on the same LEB as the hot data being relocated. Therefore the write amplification incurred by performing garbage collection is much lower for embodiments implementing heat segregation.

Secondly, the relative heat of data can be utilized for wear leveling purposes. For example, hot data may be placed in younger (e.g., healthier) memory blocks, while cold data may be placed on older (e.g., less healthy) memory blocks relative to those younger memory blocks. Thus, the rate at which relatively older blocks are exposed to wear is effectively slowed, thereby improving the lifetime of a given data storage system implementing heat segregation.

Write Allocation

Write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired embodiment, logic of a storage system may be configured to perform additional or alternative functions, as would be appreciated by one skilled in the art upon reading the present description.

Figure 3:
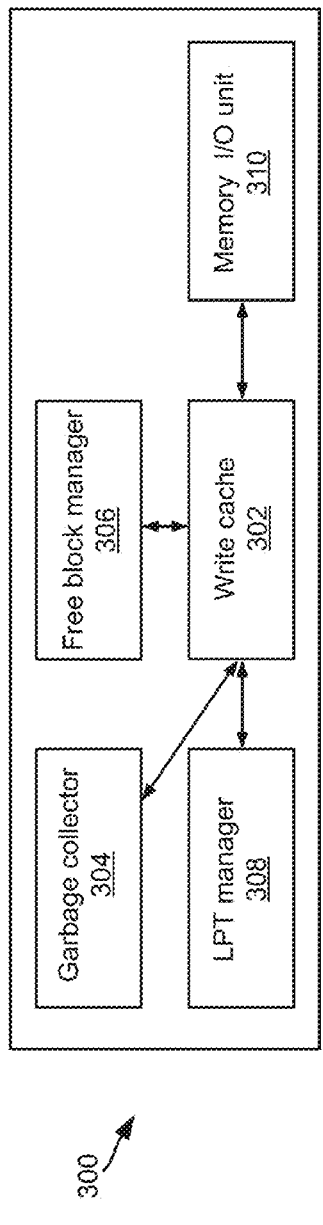
FIG. 3 is a system diagram, in accordance with one embodiment.

Referring now to FIG. 3, a system 300 is illustrated in accordance with one embodiment. As an option, the present system 300 may be implemented in conjunction with features from any other embodiment listed herein, such as those described with reference to the other FIGS. However, such system 300 and others presented herein may be used in various applications and/or in permutations which may or may not be specifically described in the illustrative embodiments listed herein. Further, the system 300 presented herein may be used in any desired environment, e.g., in combination with a controller.

As illustrated, system 300 includes a write cache 302 which is coupled to several other components, including garbage collector 304. As previously mentioned, garbage collector 304 may be used to free LEB units by relocating valid data and providing non-volatile memory blocks to be erased for later reuse. Thus the garbage collector 304 may reclaim blocks of consecutive physical space, depending on the desired embodiment. According to an exemplary embodiment, block erase units may be used to keep track of and/or complete the erase of non-volatile memory blocks handed over by the garbage collector 304.

Write cache 302 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 302 is coupled to LPT manager 308 and memory I/O unit 310. The LPT manager 308 maintains the logical-to-physical mappings of logical addresses to physical pages in memory. According to an example, which is in no way intended to limit the invention, the LPT manager 308 may maintain the logical-to-physical mappings of 4KiB logical addresses. The memory I/O unit 310 communicates with the memory chips in order to perform low level operations, e.g., such as reading one or more non-volatile memory pages, writing a non-volatile memory page, erasing a non-volatile memory block, etc.

Figure 4:
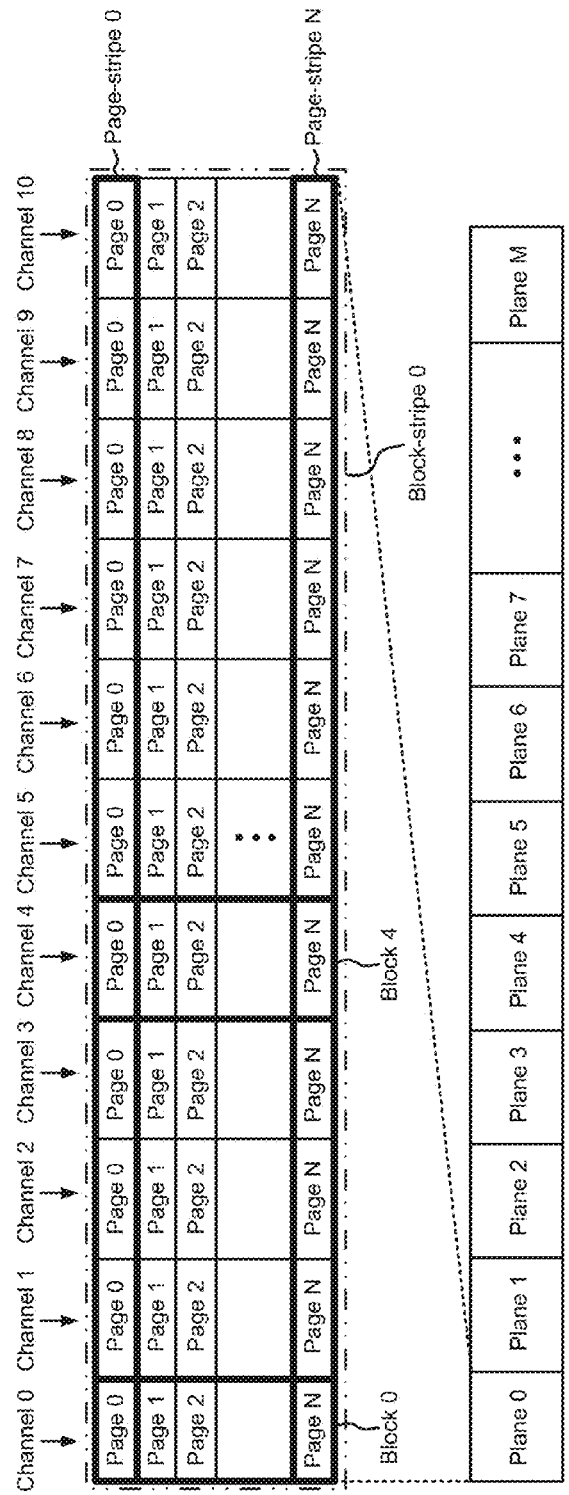
FIG. 4 is a conceptual diagram which includes a block-stripe and page-stripe, in accordance with one embodiment.

To better understand the distinction between block-stripes and page-stripes as used herein, FIG. 4 is a conceptual diagram 400, in accordance with one embodiment. As an option, the present conceptual diagram 400 may be implemented in conjunction with features from any other embodiment listed herein, such as those described with reference to the other FIGS. However, such conceptual diagram 400 and others presented herein may be used in various applications and/or in permutations which may or may not be specifically described in the illustrative embodiments listed herein. Further, the controller conceptual diagram 400 presented herein may be used in any desired environment. Thus, the exemplary non-volatile memory controller conceptual diagram 400 of FIG. 4 may be implemented in a cache architecture according to the desired embodiment.

Looking now to FIG. 4, the conceptual diagram 400 includes a set of M+1 planes labeled "Plane 0" through "Plane M". Each plane is shown as including 11 blocks of N+1 pages labeled "Page 0" through "Page N", and 11 channels labeled "Channel 0" through "Channel 10" as shown in the exploded view of Plane 0. In different embodiments, the number of pages in each block and/or the number of channels in each plane may vary depending on the desired embodiment. According to an exemplary embodiment, which is in no way intended to limit the invention, a block may include 256 pages, but could include more or less in various embodiments.

Each block of pages constitutes a unique block. Similarly, each channel corresponds to a single, individual block. For example, looking to conceptual diagram 400, Block 0 includes all pages (Page 0 through Page N) in Channel 0 while Block 4 corresponds to all pages in Channel 4, and so on.

In the context of a memory controller, e.g., which may be capable of implementing RAID at the channel level, a block-stripe is made up of multiple blocks which amount to a stripe of blocks. Looking still to FIG. 4, the multiple blocks of Plane 0 constitute Block-stripe 0. While all blocks in a block-stripe typically belong to the same plane, in some embodiments one or more blocks of a block-stripe may belong to different planes. It follows that each plane may include a block-stripe. Thus, according to an illustrative embodiment, Block 0 through Block 10 may constitute a block-stripe.

Referring still to FIG. 4, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

The raw endurance of a block of non-volatile memory may be determined by the worst performing page in the block, e.g., the page having the worst health metric. Moreover, the characterization of non-volatile memory reveals that the health metric distribution, more specifically the bit error-rate (BER) distribution across a block of non-volatile memory may not be uniform. Accordingly, blocks of memory are typically retired when the worst page therein exceeds the associated ECC correction capability, regardless of whether other pages in the same block are still desirably healthy.

Although this premature block retirement may be addressed by retiring a certain number of pages in the block when they exceed the ECC correction capability rather than the whole block itself, this causes the capacity of the block of memory to diminish over time. Moreover, even when the maximum number of retired pages is reached for a given block of memory, there may still be one or more outlier pages that limit the raw endurance of the block.

Alternate embodiments may involve monitoring the BER of pages in a block of memory and marking certain pages for relief when their corresponding BER exceeds a threshold. These marked pages may be retired temporarily such that they are only written to during certain low strain conditions, e.g., when cold data is being written thereto. However, codeword packing remains an issued due to changing capacities of the block. Moreover, once the maximum number of pages have been marked for relief, adverse effects resulting from an unmarked page becoming the new "worst page" of the block cannot be remedied, thereby limiting the raw endurance of the memory.

Various embodiments described herein are able to overcome these shortcomings and achieve desirable results. For example, various embodiments described herein may be able to distinguish and preferably write to a subset of the pages, having a fixed size, within a block of memory. It follows that such embodiments may write to a fewer number of pages than each block contains, e.g., a subset of the pages in each block. Despite which physical pages are part of a subset in a specific implementation, the subset may be dynamically reassigned (e.g., in the background) to equalize a health metric distribution, as will be described in further detail below.

Figure 5:
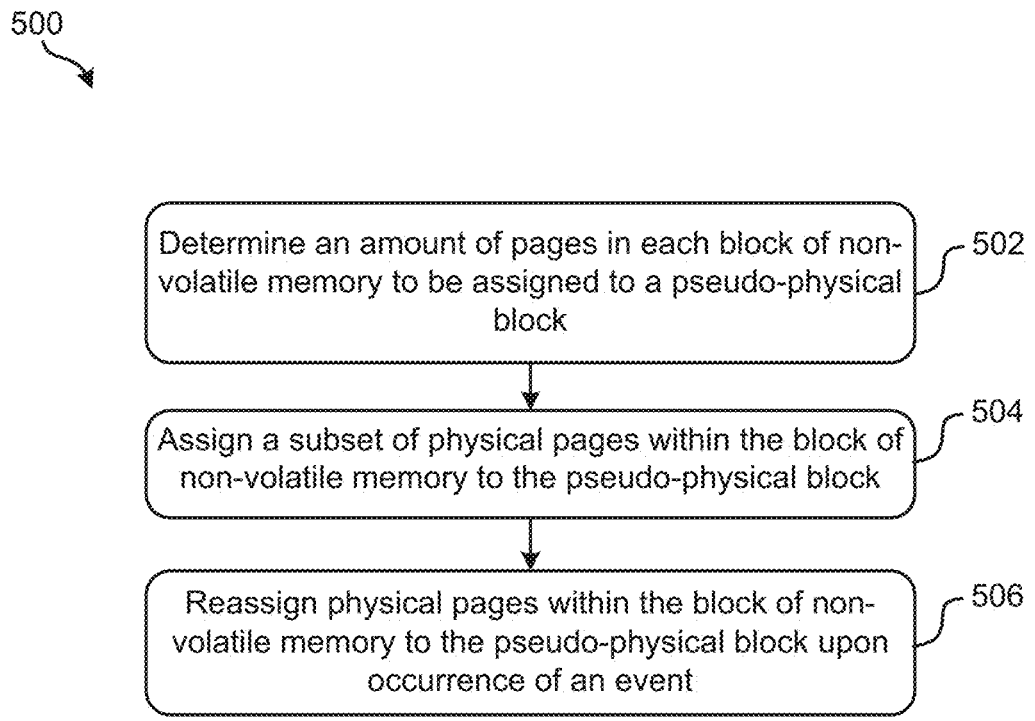
FIG. 5 is a flowchart of a method, in accordance with one embodiment.

Looking to FIG. 5, a flowchart of a method 500 is shown in accordance with one embodiment. As an option, the present method 500 may be implemented in conjunction with features from any other embodiment listed herein, such as those described with reference to the other FIGS., such as FIG. 4. However, such method 500 and others presented herein may be used in various applications and/or in permutations which may or may not be specifically described in the illustrative embodiments listed herein. Further, the method 500 presented herein may be used in any desired environment. Thus FIG. 5 (and the other FIGS.) may be deemed to include any possible permutation.

With continued reference to FIG. 5, method 500 is illustrated as including optional operation 502 which determines an amount of pages in each block of non-volatile memory that are to be assigned to a pseudo-physical block which corresponds to the non-volatile memory block. It is preferred that the number of physical pages assigned to a pseudo-physical block is less than the total number of physical pages in the non-volatile memory block. Thus, the physical pages assigned to the pseudo-physical block may be considered a subset of the pages in the block. As previously described, by distinguishing a subset of the physical pages in a given block of non-volatile memory, the subset of physical pages may be used when defining a pseudo-physical block to which data may be written exclusively, e.g., by a controller.

Method 500 additionally includes assigning a subset of physical pages within the block of non-volatile memory to the pseudo-physical block. See operation 504. The number of physical pages in the subset assigned to the pseudo-physical block preferably corresponds to the number of pages determined in optional operation 502.

Again, it is preferred that the number of pages in the pseudo-physical block is less than a number of physical pages within the non-volatile memory block. Thus, the number of physical pages in the subset is preferably less than the total number of physical pages in the block itself. Accordingly, assigning the subset of physical pages to the pseudo-physical block, the block of non-volatile memory itself may undergo a capacity reduction, e.g., from its beginning of life, or first use. Depending on the approach, the capacity reduction of the block (the percentage of unused pages within a block) may be less than about 10% of the total capacity, preferably less than about 5% of the total capacity, and in some approaches less than about 3% of the total capacity. It follows that the number of physical pages in the pseudo-physical block may be about 90%, preferably about 95%, and in some approaches 97% or more of the number of physical pages within the non-volatile memory block. Moreover, by dynamically reassigning physical pages to the pseudo-physical block, the health of the block as a whole may be equalized, as will be described in further detail below.

According to one approach, the non-volatile memory may include NAND Flash memory, but is in no way limited thereto. Again, it should be understood that various embodiments herein can be implemented with a wide range of memory mediums, including for example NVRAM technologies such as NAND Flash memory, NOR Flash memory, phase-change memory (PCM), magnetoresistive RAM (MRAM) and resistive RAM (RRAM) as would be appreciated by one skilled in the art upon reading the present description.

Figure 6:
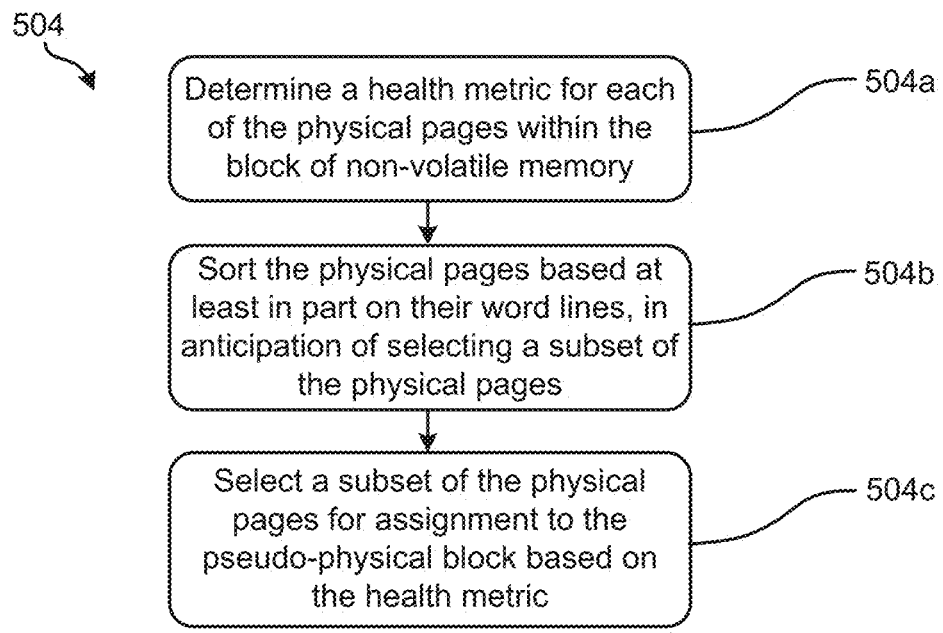
FIG. 6 is a flowchart of operation 504 of FIG. 5, in accordance with one embodiment.

The assignment performed in operation 504 may include several sub-operations 504a, 504b, 504c, as shown in FIG. 6. Sub-operation 504a includes determining a health metric for each of the physical pages within the block of non-volatile memory. Depending on the desired approach, the health of a page may correspond to one or more health metrics such as a BER, a program/erase cycle count, read/program/erase latencies, etc. and/or other health-related factors. Moreover, the health metric may be determined using any known technique corresponding to the respective health metric. According to an example, controllers may perform a background health check and/or a scrubbing operation to determine the health metric of the pages in a block of non-volatile memory. Specifically, controllers of a flash systems may perform a background health check (e.g., scrubbing operation) in the background, whereby each page and/or block of memory may be periodically inspected to determine an associated health metric. Moreover, while performing the background health operation, the assignment of pages within a block of memory may be made to define the pseudo-physical block.

Operation 504 may further include sub-operation 504b which sorts the physical pages based at least in part on their word lines, in anticipation of selecting a subset of the physical pages. In some instances, pages of non-volatile memory cannot be retired completely freely in view of the fact that cells (or word lines) contain bits from both an upper page and a lower page. In a multi-level cell (MLC) non-volatile memory device, each cell (or word line) can typically store two bits of information. Moreover, transistors associated with each respective cell may be capable of holding one of four different charges as a result of pushing electrons onto the floating gate of the transistor. Accordingly, there may be four possible states which a transistor can be programmed to store for the respective cell. Typically, one of the bits belongs to a "lower page" while the other of the two bits belongs to an "upper page". The bit which correspond to the lower page is typically programmed first, while the second bit (e.g., corresponding to the upper page) is programmed later. Thus, the lower page cannot be retired individually without affecting the upper page.

As a result, blocks include some structure due to cell architecture which is desirably taken into account when selecting a subset of physical pages. As will be appreciated by one skilled in the art upon reading the present description, physical pages are preferably sorted such that upper and lower page pairs corresponding to the same cell share a common assignment. For example, an upper and lower page pair corresponding to the same cell may preferably both be assigned to a pseudo-physical block, or both be unused depending on the desired embodiment. However, it should be noted that the preferred common assignment of upper and lower page pairs corresponding to the same cell is in no way intended to limit the invention and may be disregarded in certain approaches. For instance, in some embodiments the lower page may be assigned to a pseudo-physical block while the upper page is not.

With continued reference to FIG. 6, sub-operation 504c includes selecting a subset of the physical pages for assignment to the pseudo-physical block based on the health metric. For example, according to one approach, a given number of physical pages having the lowest BER may be assigned to the pseudo-physical block.

After assigning a subset of physical pages to the pseudo-physical block (e.g., see operation 504), method 500 may include reassigning physical pages within the block of non-volatile memory to the pseudo-physical block upon occurrence of an event, e.g.; such as expiration of a period of time, e.g., 5 days, 1 week, 2 weeks, etc.; passage of a predefined number of program/erase (P/E) cycles, e.g., 500 P/E cycles, 1000 P/E cycles, etc.; etc. See operation 506. It follows that, depending on the desired approach, any of the physical pages included in the block may be reassigned to reconstruct (form) any of the subsequent pseudo-physical blocks. Thus, although one or more particular physical pages may have been unused during a previous assignment period (e.g., pages which were not assigned to the previous subset of pages), one or more of those same pages may be reassigned to reconstruct pseudo-physical blocks in one or more subsequent reassignments.

As previously mentioned, dynamically reassigning physical pages to the pseudo-physical block may allow for the health of the block as a whole to be equalized, and as a result, the page health metrics of individual pages within a block may desirably not have a significant distribution. According to a specific approach, which is in no way intended to limit the invention, by actively equalizing the health metric distribution (e.g., BER distribution) across all pages of a block of memory, raw endurance may be extended further than achievable using prior techniques. Moreover, by implementing a fixed capacity for a memory block, fixed codeword packing schemes may be applied to the pages of the memory block without the introducing the complexity associated with misalignment as experienced in conventional products which have a shifting block size.

It follows that, according to preferred approaches, a subset of pages assigned to a pseudo-physical block may have a fixed size for at least a number of reassignments, e.g., one reassignment, two reassignments, three reassignments, multiple reassignments, all reassignments, etc. However, it should again be noted that although the subset of physical pages has a fixed size (e.g., a fixed number of pages), the specific pages which are assigned to a subset are not fixed. By selectively changing which pages make up the pseudo-physical block, embodiments described herein may be able to at least temporarily relieve pages having a higher health metric (e.g., BER). Thus, each time a pseudo-physical block is reassigned to a different set of pages, provision may be made to account for shifting health metric values of the pages within the block and equalize the health metric distribution. Although a particular physical page may be assigned to a pseudo-physical block for a particular approach, that same physical page may be unused in one or more subsequent reassignments. Moreover, the number of reassignments for which a subset of pages has a fixed size may be irrespective of the data written to the pages, a health metric of the pages and/or memory block, etc.

When performing a reassignment operation, any data stored on pages which have been removed from a pseudo-physical block (e.g., become unused) is preferably extracted and stored in a different location. Additionally, reconstructing the pseudo-physical block includes erasing the metadata associated with the previously unused physical pages and replacing it with different metadata corresponding to the new unused physical pages. In other words, the mapping of the pseudo-physical block is being updated. However, it is preferred that this, and any other updates to the data storage system, be implemented upon performing a garbage collection, e.g., to prevent the loss of any such data. According to one approach, a new pseudo-physical block assignment and/or data stored on any of the pages may be stored (e.g., in a lookup table in memory) until a garbage collection operation is performed on the block, at which point an updated pseudo-physical block assignment may be enacted. Thus, when a block of non-volatile memory is erased, a new pseudo-physical block assignment may be implemented.

By assigning a subset of the physical pages to a pseudo-physical block, the capacity of the block of non-volatile memory is reduced from its beginning of life (e.g., first use). However, as a block of non-volatile memory is used over time, different characteristics of the block may change. As a result, the number of pages assigned to the pseudo-physical block may also be changed. For example, as a health metric distribution of a block of non-volatile memory worsens as the number of P/E cycles performed on the block increases, the number of pages assigned to the pseudo-physical block may be increased. Accordingly, capacity of the block may be sacrificed in order to improve the overall health metric distribution thereof upon reaching a predetermined overall page health metric distribution, performing a number of P/E cycles on the memory block, user input, etc. However, although the number of pages assigned to the pseudo-physical block may change with time and/or use, it is highly desirable that a size of the pseudo-physical blocks remain the same for all blocks accessed by a single controller. Thus, if the number of physical pages in a specific pseudo-physical block increases from about 90% to about 95% of the number of physical pages within the associated non-volatile memory block, the size of all other pseudo-physical blocks accessed by the same controller preferably increases the same amount as well.

Metadata associated with unused physical pages of a block (e.g., pages which are not in a subset of pages) is also stored for future use. According to one approach, the metadata may include the health metrics of the associated unused physical pages. For example, metadata associated with the health metrics of the unused physical pages may be stored and later used during a reassignment operation, e.g., to determine which physical pages are to be assigned to an updated pseudo-physical block. It is preferred that the health metric of the unused pages at the previous iteration is compared the updated health metric of each of the pages in the subset when reassigning the pseudo-physical block. As a result, the determination may be made as to whether the unused pages are still the "worst" performing pages of the block, whereby the unused pages may be replaced during a reassignment operation with one or more pages which have become the new "worst" performing pages.

However, according to another approach, the metadata may include a location of each of the unused physical pages within the block of non-volatile memory. Embodiments implementing non-volatile memory include logical data which is mapped to a physical address. Accordingly, the locations of the unused physical pages may be used to skip over them when writing data to the subset of pages which make up the pseudo-physical block. According to some approaches, LPTs may be implemented to maintain where particular data is physically stored in the pseudo-physical block. Thus, although various embodiments described herein prevent a percentage of the pages included in a block of memory from being used, an LPT may be able to map data to the pages of the pseudo-physical block, e.g., as described in further detail below with reference to Table 1.

LPTs may employ a binary vector having a length which represents each page of the associated non-volatile memory block. Moreover, each entry of the binary vector may have a value of either 0, denoting that the corresponding physical page is not in use, or 1, denoting that the corresponding physical page is in use, or vice versa. According to another approach, the metadata may be stored in a "sparse form" which simply includes storing the index of each of the unused pages within the block of memory. In yet further approaches, the index of the unused pages in the physical block may be stored in addition to the number of consecutive unused pages, e.g., as described in further detail below with reference to Table 2.

By only writing to a subset of the physical pages included in a block of non-volatile memory at a given time, approaches described herein may be able to negate the effects of pages having poor health metrics. Moreover, by dynamically reassigning the pages in a pseudo-physical block, e.g., during a background health check, the health metric distribution of the pages in the block may be equalized. Moreover, when pages of a block of non-volatile memory are reassigned with adequate frequency, all pages within the block may have about the same health metric value.

Figure 7A:
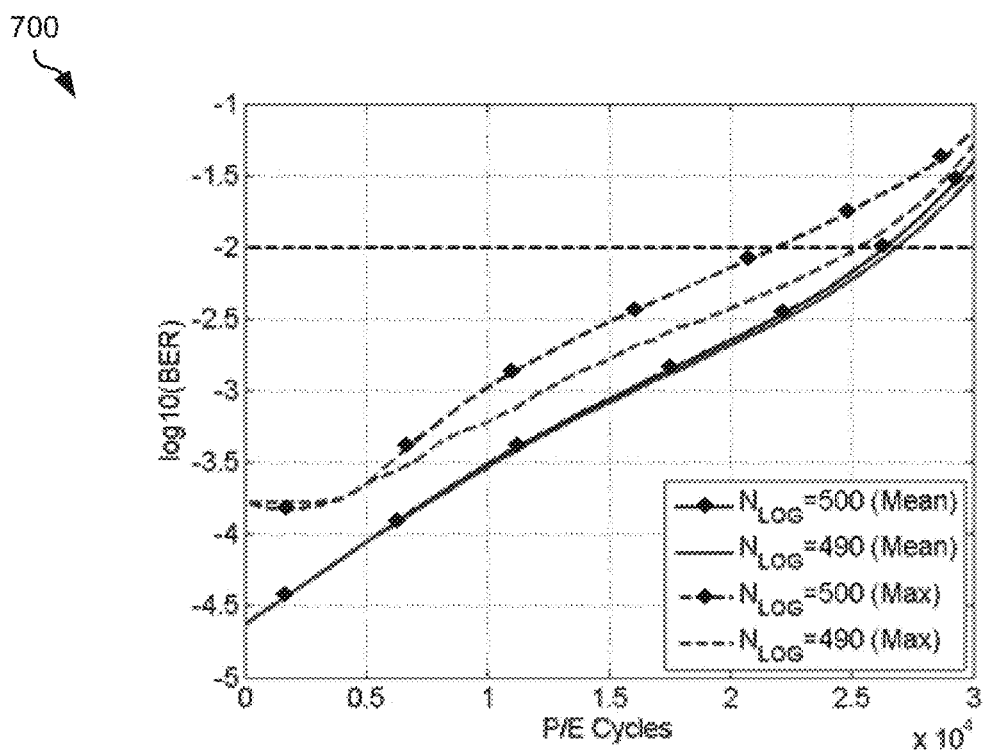
FIG. 7A is a graph illustrating the bit error rate for different memory blocks with respect to the number of program/erase cycles performed thereon, in accordance with one embodiment.
Figure 7B:
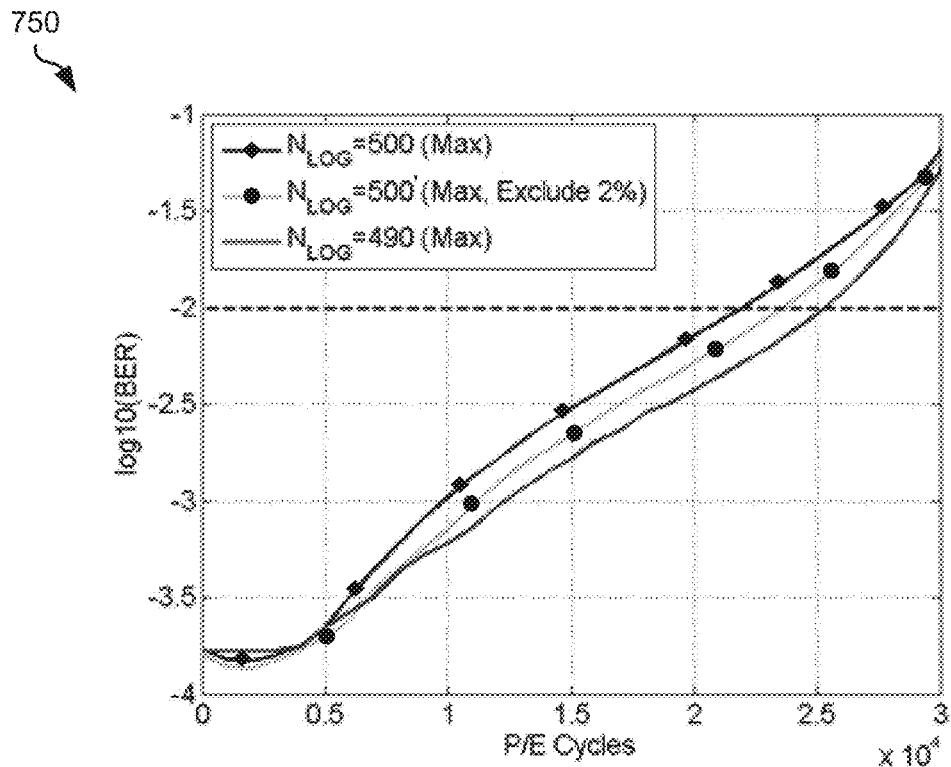
FIG. 7B is a graph illustrating the bit error rate for different memory blocks with respect to the number of program/erase cycles performed thereon, in accordance with one embodiment.

FIGS. 7A-7B illustrate the improvements to health metric distribution across memory blocks achieved using the various approaches described herein. Referring specifically to FIG. 7A, the graph 700 depicted therein includes the average BER (Mean) of two different memory blocks as a function of P/E cycles performed thereto in addition to the BER of the worst page in the respective blocks (Max). The data represented in graph 700 resulted from synthetic modeling performed by the inventors, which has been fitted to experimental data. The modeling was performed on data captured in an experiment during which, 30,000 P/E cycles were performed on each memory block, with a worst-case 2 second dwell time, where the dwell time represents the time between consecutive program/erase cycles.

Looking to the curves plotted in graph 700, $N_{LOG}=500$ corresponds to a memory block subjected to the P/E cycles without the assistance of any health management operations. Thus, data was written to all 500 pages of the memory block. Alternatively, $N_{LOG}=490$ corresponds to a memory block which has experienced page-level health metric distribution equalization as described in the various approaches herein. Specifically, the memory block corresponding to the $N_{LOG}=490$ curve had a pseudo-physical block of 490 pages, resulting in 10 pages being unused.

As shown, the worst performing page of the memory block which has experienced page-level health metric distribution equalization is much closer to the average BER of the block than for the memory block corresponding to the $N_{LOG}=500$ curve. This improved performance seen in the $N_{LOG}=490$ curve translated to a 15% endurance improvement over other conventional products. Moreover, the page-level health metric distribution equalization was able to cause a much more even BER distribution than conventionally achievable.

Looking now to FIG. 7B, graph 750 includes the BER of the worst page (Max) according to three respective memory blocks. Similar to FIG. 7A, $N_{LOG}=500$ corresponds to a memory block subjected to the P/E cycles without the assistance of any health management operations, while $N_{LOG}=490$ corresponds to a memory block which has experienced page-level health metric distribution equalization as described in the various approaches herein. Additionally, $N_{LOG}=500'$ corresponds to a memory block in which the worst 2% of the pages are excluded artificially at any given time when computing the worst page BER. The performance of such a scheme is closely related to the performance of page-level retirement schemes. As shown, the BER of the worst page in the block of memory for the $N_{LOG}=490$ curve is significantly less than either of the other two curves, particularly as the number of P/E cycles increase. Thus, by actively shaping the BER distribution of a non-volatile memory block, an enhanced endurance may desirably be achieved.

Again, the approaches described and/or suggested herein may desirably be able to achieve a fixed codeword packing scheme as a result of having a fixed pseudo-physical block capacity for at least a number of reassignment operations. Moreover, various approaches described and/or suggested herein are able to desirably actively equalize the health metric (e.g., BER) distribution to a minimum value across the pages of a block of non-volatile memory, thereby allowing for raw endurance of the block to be extended further than achievable using prior techniques.

According to an exemplary in-use embodiment, which is in no way intended to limit the invention, dynamic assignment of a 12 page pseudo-physical block may be implemented on a block of non-volatile memory having 16 pages as illustrated in Table 1 below.

TABLE 1

| Page Index | Write Index |
|---|---|
| 0 | 0 |
| 1 | 1 |
| 2 | 3 |
| 3 | 4 |
| 4 | 6 |
| 5 | 7 |
| 6 | 8 |
| 7 | 9 |
| 8 | 12 |
| 9 | 13 |
| 10 | 14 |
| 11 | 15 |

As previously mentioned, a non-volatile memory block may include 16 physical pages while a pseudo-physical block associated therewith may include 12 pages. It follows that the Page Index column of Table 1 advances from 0 to 11 (representing the 12 pages of the pseudo-physical block), while the Write Index column outlines which physical page within the memory block data should actually be written into. For example, if data is to be written to Page Index 7 of the pseudo-physical block, an LPT such as Table 1 may be accessed to determine that the data should actually be written to physical page 9 of the memory block. Thus, Table 1 defines the mapping from the index in the pseudo-physical block into the actual physical page in the block of memory which data is to be written into according to the exemplary in-use embodiment.

Alternative to an LPT, the index of the unused pages in the physical block may be stored in addition to the number of consecutive unused pages as illustrated in Table 2 below.

TABLE 2

| Skip Page | Skip Length |
|---|---|
| 2 | 1 |
| 5 | 1 |
| 10 | 2 |

It should be noted that the metadata stored in Table 2 represents the same page assignment illustrated in Table 1, except using a different approach. As mentioned above, Table 2 includes the index of the unused pages in addition to the number of consecutive unused pages. Accordingly, the Skip Page column lists the indices at which a physical page should be skipped (e.g., not written to) while the Skip Length column denotes how many consecutive physical pages should be skipped (e.g., not written to). For instance, the third entry in the table indicates that physical pages 10 and 11 of the memory block should be unused in view of the Skip Length of 2. However, it should be noted that the example provided in Table 1 and Table 2 is a specific embodiment which is in no way intended to limit the invention.

Figure 11:
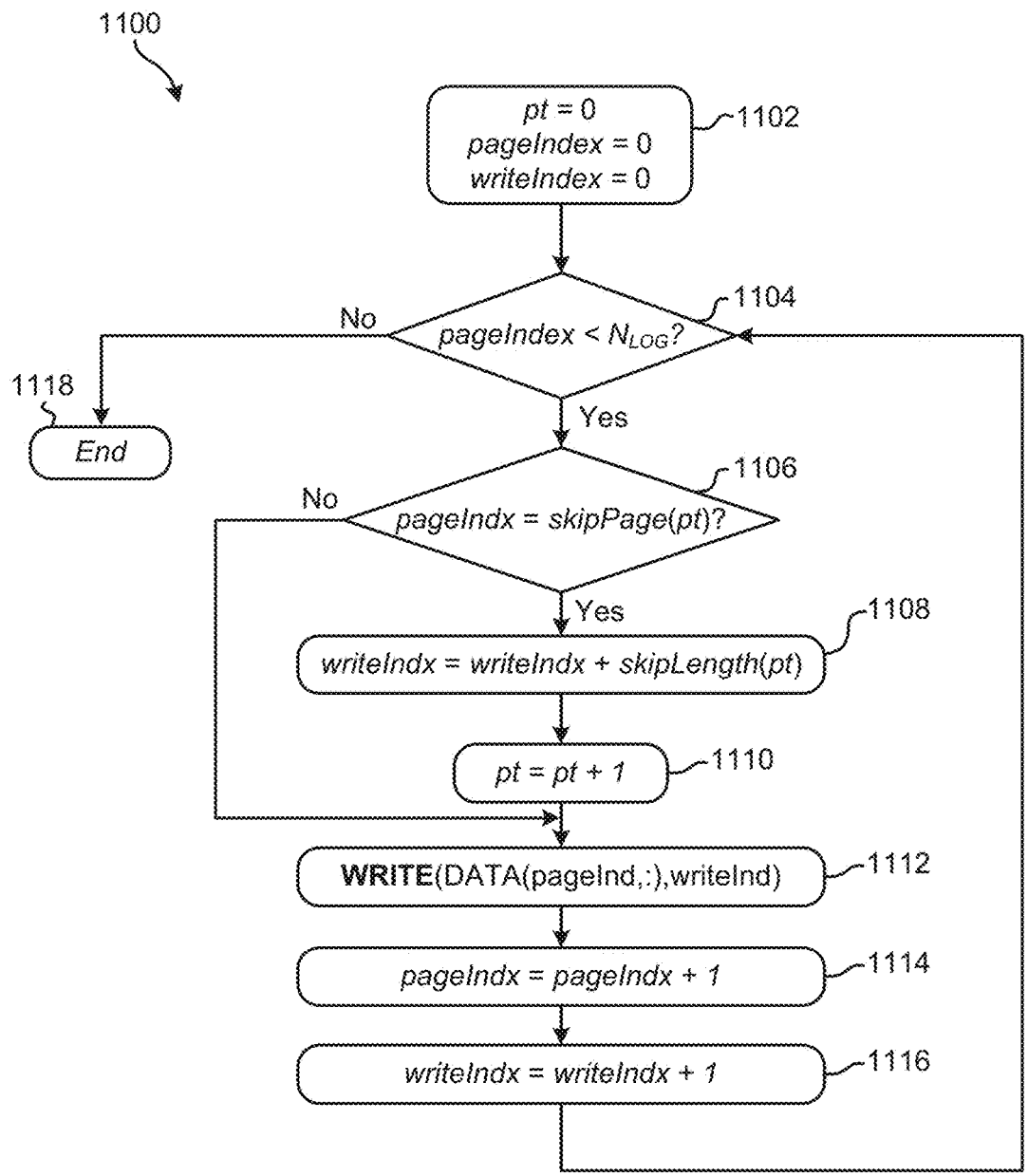
FIG. 11 is a flowchart of a process, in accordance with one embodiment.

An exemplary flowchart of a process 1100 which may be used to implement writing to pages of a pseudo-physical block with user comments included is also provided in FIG. 11. It should be noted that the exemplary flowchart of FIG. 11 corresponds to a particular in-use embodiment which is presented by way of example only and is in no way intended to limit the invention.

Operation 1102 of FIG. 11 includes setting the value of skip counter (pt) equal to 0, the value of page index in the logical block (pageIndex) equal to 0 and the value of page index in the physical block (writeIndex) equal to 0. Moreover, decision 1104 determines whether the value of pageIndx is less than the value of $N_{LOG}$. When decision 1104 determines the value of pageIndx is less than the value of $N_{LOG}$, process 1100 proceeds to decision 1106 which then determines whether pageIndx=skipPage(pt). When it is determined that decision 1106 is satisfied, process 1100 proceeds to operation 1108. However, when it is determined that pageIndx #skipPage(pt), decision 1106 directs the flow of process 1100 to operation 1112 which is described below.

Operation 1108 includes calculating writeIndx=writeIndx+skipLength(pt) whereby unused pages may be skipped. Process 1100 then proceeds to operation 1110 which includes incrementing the value of pt by 1 from its previous value. Furthermore, operation 1112 includes writing data to non-volatile memory by performing WRITE (DATA(pageInd,:),writeInd). Moreover, operation 1114 includes incrementing the value of pageIndx by 1 and similarly, operation 1116 includes incrementing the value of writeIndx by 1.

After operation 1116 is performed, process 1100 returns to decision 1104 and again determines whether the value of pageIndx is less than the value of $N_{LOG}$. However, when it is determined that the value of pageIndx is greater or equal to the value of $N_{LOG}$, process 1100 proceeds to operation 1118 whereby process 1100 is ended.

Moreover, embodiments which include performing read operations to non-volatile memory implementing page-level health equalization according to any of the approaches described herein, may function similar to the exemplary in-use embodiments presented above. For example, LPT tables may be implemented when reading data from memory having page-level health equalization. As described above, implementing non-volatile memory includes logical data which is mapped to a physical address. Accordingly, the locations of the physical pages within a block of non-volatile memory may be used to skip over such physical pages when read data from the subset of pages which make up the pseudo-physical block. According to some approaches, LPTs may be implemented to maintain where particular data is physically stored in the pseudo-physical block. Thus, although various embodiments described herein prevent a percentage of the pages included in a block of memory from being used, an LPT may be able to map data to the pages of the pseudo-physical block which may be utilized when reading data therefrom. Specifically, LPTs such as those illustrated in Table 1 and Table 2 may be implemented when reading data stored in a pseudo-physical block. However, it should again be noted that the example provided in Table 1 and Table 2 is a specific embodiment which is in no way intended to limit the invention.

According to an exemplary in-use embodiment, which is in no way intended to limit the invention, an apparatus may receive a request (e.g., a user request) to read the data of a given page index in a pseudo-physical block. The read request may be translated from being represented in terms of the page index in a pseudo-physical block, to an associated physical page index, e.g., using the LPT. Once the read request is in terms of a physical page index, the read request may be processed by and/or issued to a non-volatile memory device, e.g., a controller, as would be appreciated by one skilled in the art upon reading the present description.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Figure 8:
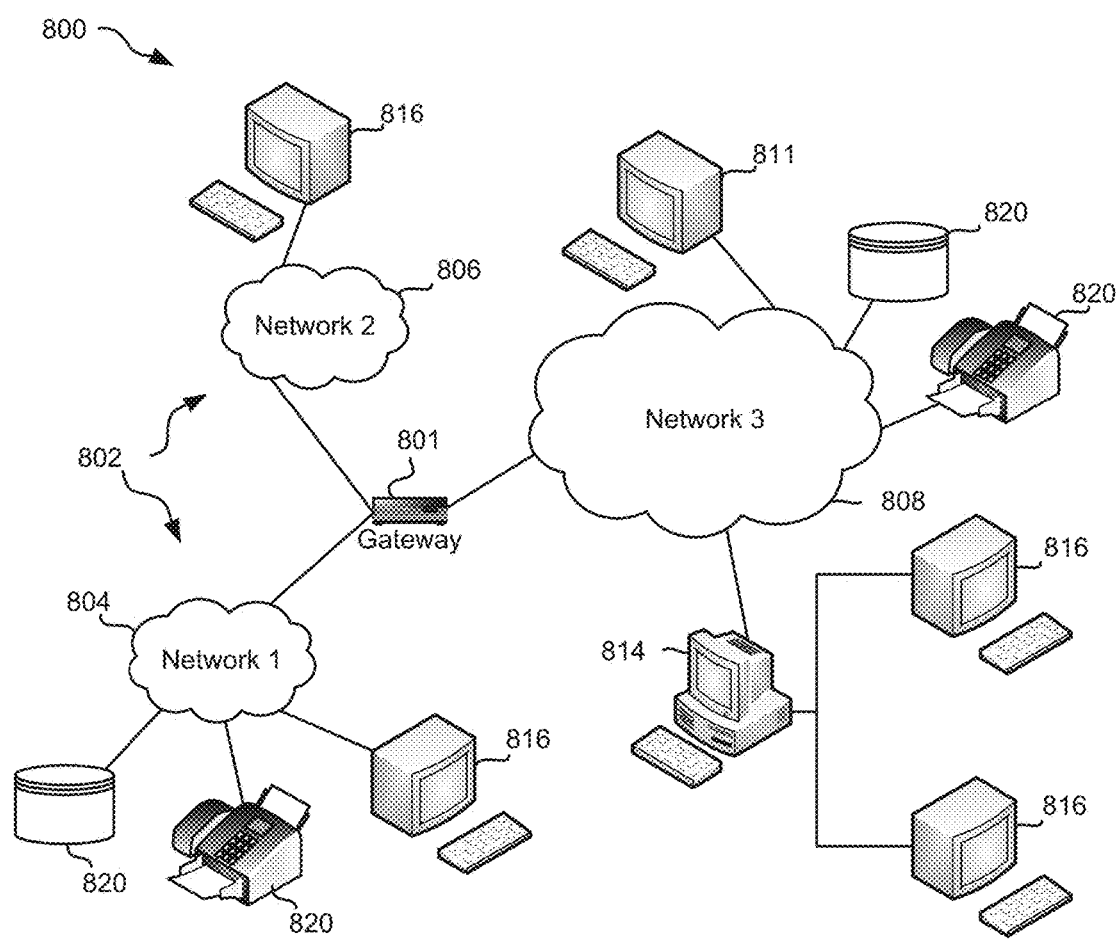
FIG. 8 is a network architecture, in accordance with one embodiment.

FIG. 8 illustrates a network architecture 800, in accordance with one embodiment. As shown in FIG. 8, a plurality of remote networks 802 are provided including a first remote network 804 and a second remote network 806. A gateway 801 may be coupled between the remote networks 802 and a proximate network 808. In the context of the present network architecture 800, the networks 804, 806 may each take any form including, but not limited to a LAN, a WAN such as the Internet, public switched telephone network (PSTN), internal telephone network, etc.

In use, the gateway 801 serves as an entrance point from the remote networks 802 to the proximate network 808. As such, the gateway 801 may function as a router, which is capable of directing a given packet of data that arrives at the gateway 801, and a switch, which furnishes the actual path in and out of the gateway 801 for a given packet.

Further included is at least one data server 814 coupled to the proximate network 808, and which is accessible from the remote networks 802 via the gateway 801. It should be noted that the data server(s) 814 may include any type of computing device/groupware. Coupled to each data server 814 is a plurality of user devices 816. Such user devices 816 may include a desktop computer, laptop computer, handheld computer, printer, and/or any other type of logic-containing device. It should be noted that a user device 811 may also be directly coupled to any of the networks, in some embodiments.

A peripheral 820 or series of peripherals 820, e.g., facsimile machines, printers, scanners, hard disk drives, networked and/or local data storage units or systems, etc., may be coupled to one or more of the networks 804, 806, 808. It should be noted that databases and/or additional components may be utilized with, or integrated into, any type of network element coupled to the networks 804, 806, 808. In the context of the present description, a network element may refer to any component of a network.

According to some embodiments, methods and systems described herein may be implemented with and/or on virtual systems and/or systems which emulate one or more other systems, such as a UNIX system which virtually hosts a MICROSOFT WINDOWS environment, etc. This virtualization and/or emulation may be enhanced through the use of VMWARE software, in some embodiments.

In other embodiments, one or more networks 804, 806, 808, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 9:
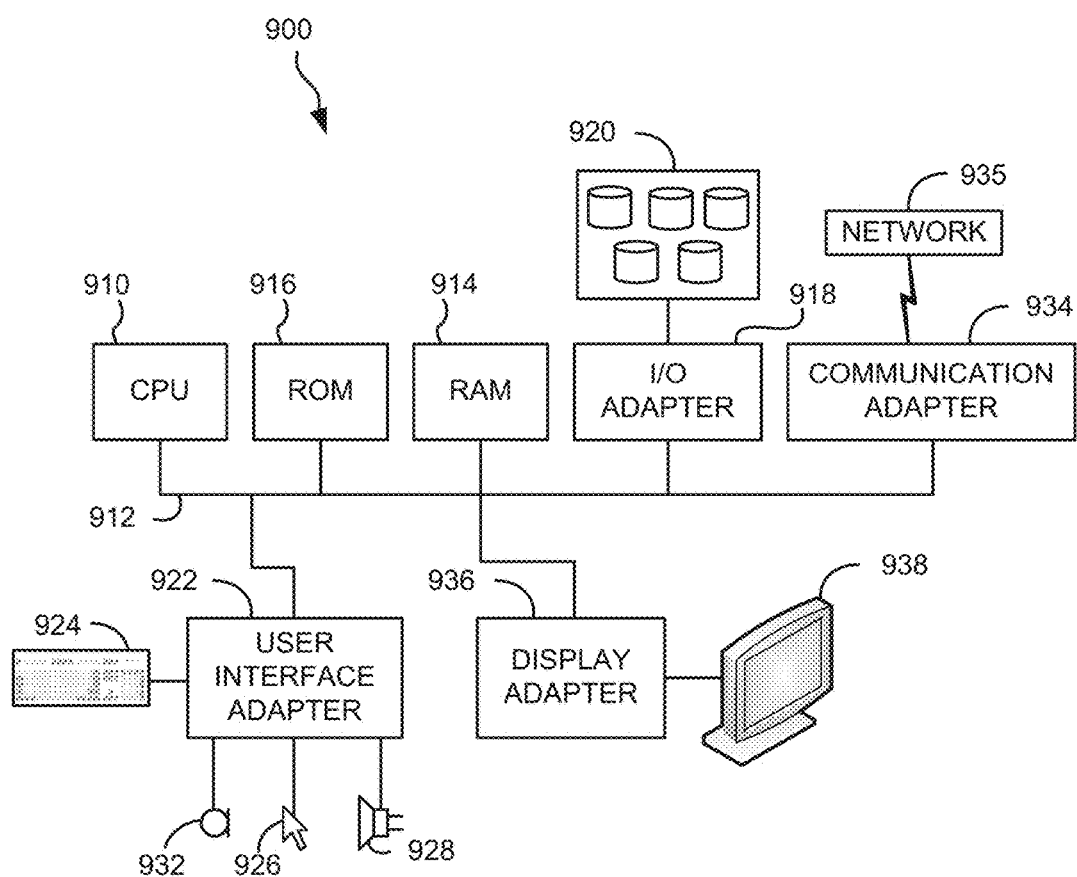
FIG. 9 is a representative hardware environment that may be associated with the servers and/or clients of FIG. 8, in accordance with one embodiment.

FIG. 9 shows a representative hardware environment associated with a user device 816 and/or server 814 of FIG. 8, in accordance with one embodiment. FIG. 9 illustrates a typical hardware configuration of a processor system 900 having a central processing unit 910, such as a microprocessor, and a number of other units interconnected via a system bus 912, according to one embodiment. In some embodiments, central processing unit 910 may include any of the approaches described above with reference to the one or more processors 210 of FIG. 2.

The processor system 900 shown in FIG. 9 includes a Random Access Memory (RAM) 914, Read Only Memory (ROM) 916, and an I/O adapter 918. According to some embodiments, which are in no way intended to limit the invention, I/O adapter 918 may include any of the approaches described above with reference to I/O adapter 218 of FIG. 2. Referring still to processor system 900 of FIG. 9, the aforementioned components 914, 916, 918 may be used for connecting peripheral devices such as storage subsystem 920 to the bus 912. In some embodiments, storage subsystem 920 may include a similar and/or the same configuration as data storage system 220 of FIG. 2. According to an example, which is in no way intended to limit the invention, storage subsystem 920 may include non-volatile data storage cards, e.g., having NVRAM memory cards, RAM, ROM, and/or some other known type of non-volatile memory, in addition to RAID controllers as illustrated in FIG. 2.

With continued reference to FIG. 9, a user interface adapter 922 for connecting a keyboard 924, a mouse 926, a speaker 928, a microphone 932, and/or other user interface devices such as a touch screen, a digital camera (not shown), etc., to the bus 912.

Processor system 900 further includes a communication adapter 934 which connects the processor system 900 to a communication network 935 (e.g., a data processing network) and a display adapter 936 which connects the bus 912 to a display device 938.

The processor system 900 may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 10:
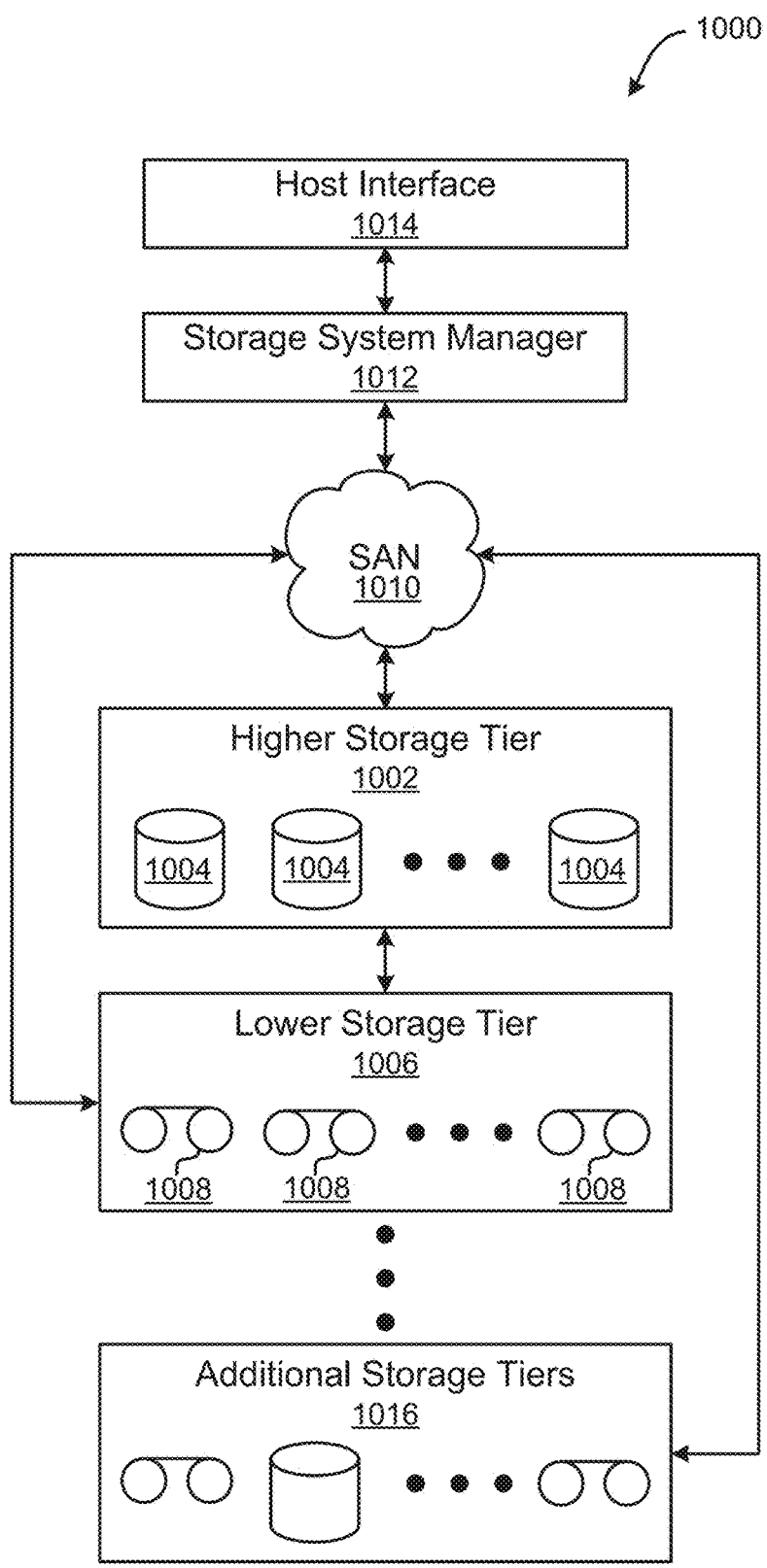
FIG. 10 is a tiered data storage system in accordance with one embodiment.

Moreover, FIG. 10 illustrates a storage system 1000 which implements high level (e.g., SSD) storage tiers in combination with lower level (e.g., magnetic tape) storage tiers, according to one embodiment. Note that some of the elements shown in FIG. 10 may be implemented as hardware and/or software, according to various embodiments. The storage system 1000 may include a storage system manager 1012 for communicating with a plurality of media on at least one higher storage tier 1002 and at least one lower storage tier 1006. However, in other approaches, a storage system manager 1012 may communicate with a plurality of media on at least one higher storage tier 1002, but no lower storage tier. The higher storage tier(s) 1002 preferably may include one or more random access and/or direct access media 1004, such as hard disks, nonvolatile memory (NVM), NVRAM), solid state memory in SSDs, flash memory, SSD arrays, flash memory arrays, etc., and/or others noted herein or known in the art. According to illustrative examples, FIGS. 3-4 show exemplary architectures of SSD systems which may be used as a higher storage tier 1002 depending on the desired embodiment.

Referring still to FIG. 10, the lower storage tier(s) 1006 preferably includes one or more lower performing storage media 1008, including sequential access media such as magnetic tape in tape drives and/or optical media, slower accessing HDDs, slower accessing SSDs, etc., and/or others noted herein or known in the art. One or more additional storage tiers 1016 may include any combination of storage memory media as desired by a designer of the system 1000. Thus the one or more additional storage tiers 1016 may, in some approaches, include a SSD system architecture similar or the same as those illustrated in FIGS. 1-2. Also, any of the higher storage tiers 1002 and/or the lower storage tiers 1006 may include any combination of storage devices and/or storage media.

The storage system manager 1012 may communicate with the storage media 1004, 1008 on the higher storage tier(s) 1002 and lower storage tier(s) 1006 through a network 1010, such as a storage area network (SAN), as shown in FIG. 10, or some other suitable network type. The storage system manager 1012 may also communicate with one or more host systems (not shown) through a host interface 1014, which may or may not be a part of the storage system manager 1012. The storage system manager 1012 and/or any other component of the storage system 1000 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 1000 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 1002, may include a majority of SSD storage media for storing data in a higher performing storage environment, and remaining storage tiers, including lower storage tier 1006 and additional storage tiers 1016 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 1002, while data not having one of these attributes may be stored to the additional storage tiers 1016, including lower storage tier 1006. Of course, one of skill in the art, upon reading the present descriptions, may devise many other combinations of storage media types to implement into different storage schemes, according to the embodiments presented herein.

According to some embodiments, the storage system (such as 1000) may include logic configured to receive a request to open a data set, logic configured to determine if the requested data set is stored to a lower storage tier 1006 of a tiered data storage system 1000 in multiple associated portions, logic configured to move each associated portion of the requested data set to a higher storage tier 1002 of the tiered data storage system 1000, and logic configured to assemble the requested data set on the higher storage tier 1002 of the tiered data storage system 1000 from the associated portions.

Of course, this logic may be implemented as a method on any device and/or system or as a computer program product, according to various embodiments.

What is claimed is:

1. A computer-implemented method, comprising:
    assigning a subset of physical pages within a block of non-volatile memory to a pseudo-physical block, wherein a number of pages in the subset of physical pages assigned to the pseudo-physical block is less than a number of physical pages within the non-volatile memory block;
    wherein the assigning includes:
        determining a health metric for each of the physical pages within the block of non-volatile memory; and
        selecting the subset of the physical pages for assignment to the pseudo-physical block based on the health metric; and
    reassigning physical pages within the block of non-volatile memory to the pseudo-physical block upon occurrence of an event;
    wherein the reassigning maintains the number of pages in the subset of physical pages assigned to the pseudo-physical block,
    wherein the number of pages in the subset of physical pages is fixed for at least a number of reassignments,
    wherein the number of pages in the subset of physical pages is changeable upon the number of reassignments being performed, and
    wherein the number of pages in the subset of physical pages is a same number as a number of pages in each subset of physical pages assigned to each pseudo-physical block accessed by a same controller.

2. The computer-implemented method as recited in claim 1, wherein the non-volatile memory includes NAND Flash memory, wherein the selecting the subset of the physical pages is also based on an architecture of cells corresponding to the physical pages.

3. The computer-implemented method as recited in claim 1, wherein unused physical pages of the block which are not in the subset of physical pages are reassigned to pseudo-physical blocks in one or more of the at least a number of reassignments, wherein the number of physical pages in the pseudo-physical block is 95% or more of the number of physical pages within the non-volatile memory block, wherein the non-volatile memory includes NAND Flash memory.

4. The computer-implemented method as recited in claim 1, comprising:
    storing metadata associated with unused physical pages of the block which are not in the subset of physical pages, wherein data is not written to the unused physical pages.

5. The computer-implemented method as recited in claim 4, wherein the metadata includes a location of each of the unused physical pages within the block of non-volatile memory, wherein the metadata includes the health metrics of the associated unused physical pages.

6. The computer-implemented method as recited in claim 4, wherein the reassigning the physical pages includes:
    erasing metadata associated with previously unused physical pages of the block which have been assigned to the pseudo-physical block; and
    storing metadata associated with unused physical pages of the block which are not assigned to the pseudo-physical block.

7. The computer-implemented method as recited in claim 1, wherein the reassigning of the physical pages equalizes a health metric distribution of the block of non-volatile memory, wherein the reassigning is performed during a garbage collection operation.

8. The computer-implemented method as recited in claim 4, wherein the assigning includes:
    sorting each of the physical pages based on cells corresponding thereto,
    wherein pairs of physical pages corresponding to a same cell share a common assignment, wherein the event is selected from a group of events consisting of: expiration of a period of time, and passage of a predefined number of program/erase cycles, wherein the reassigning the physical pages includes:

erasing metadata associated with previously unused physical pages of the block which have been assigned to the pseudo-physical block; and storing metadata associated with unused physical pages of the block which are not assigned to the pseudo-physical block.

9. An apparatus, comprising:

non-volatile memory configured to store data; and a controller and logic integrated with and/or executable by the controller, the logic being configured to:

assign a subset of physical pages within a block of the non-volatile memory to a pseudo-physical block, wherein a number of pages in the subset of physical pages assigned to the pseudo-physical block is less than a number of physical pages within the block of non-volatile memory;

wherein the assigning includes:

determine a health metric for each of the physical pages within the block of non-volatile memory; and select the subset of the physical pages for assignment to the pseudo-physical block based on the health metric; and reassign physical pages within the block of non-volatile memory to the pseudo-physical block upon occurrence of an event;

wherein the reassigning maintains the number of pages in the subset of physical pages assigned to the pseudo-physical block, wherein the number of pages in the subset of physical pages is fixed for at least a number of reassignments, wherein the number of pages in the subset of physical pages is changeable upon the number of reassignments being performed, and wherein the number of pages in the subset of physical pages is a same number as a number of pages in each subset of physical pages assigned to each pseudo-physical block accessed by a same controller.

10. The apparatus as recited in claim 9, wherein the non-volatile memory includes NAND Flash memory, wherein the selecting the subset of the physical pages is also based on an architecture of cells corresponding to the physical pages.

11. The apparatus as recited in claim 9, wherein unused physical pages of the block which are not in the subset of physical pages are reassigned to pseudo-physical blocks in one or more of the at least a number of reassignments, wherein the number of physical pages in the pseudo-physical block is 95% or more of the number of physical pages within the block of non-volatile memory, wherein the non-volatile memory includes NAND Flash memory.

12. The apparatus as recited in claim 9, comprising:

storing metadata associated with unused physical pages of the block which are not in the subset of physical pages, wherein data is not written to the unused physical pages.

13. The apparatus as recited in claim 12, wherein the metadata includes a location of each of the unused physical pages within the block of non-volatile memory, wherein the metadata includes the health metrics of the associated unused physical pages.

14. The apparatus as recited in claim 12, wherein the reassigning the physical pages includes:

erasing metadata associated with previously unused physical pages of the block which have been assigned to the pseudo-physical block; and storing metadata associated with unused physical pages of the block which are not assigned to the pseudo-physical block.

15. The apparatus as recited in claim 9, wherein the reassigning of the physical pages equalizes a health metric distribution of the block of non-volatile memory, wherein the reassigning is performed during a garbage collection operation.

16. The apparatus as recited in claim 15, wherein the reassigning of the physical pages includes: comparing the health metric of unused physical pages of the block which are not in the subset of physical pages with updated health metrics of a plurality of the physical pages assigned to the pseudo-physical block.

17. The computer program product as recited in claim 12, wherein the assigning includes:

sorting each of the physical pages based on cells corresponding thereto, wherein pairs of physical pages corresponding to a same cell share a common assignment, wherein the event is selected from a group of events consisting of: expiration of a period of time, and passage of a predefined number of program/erase cycles, wherein the metadata includes a location of each of the unused physical pages within the block of non-volatile memory.

18. A computer program product comprising a computer readable storage medium having program instructions embodied therewith, the program instructions readable and/or executable by a controller to cause the controller to:

assign, by the controller, a subset of physical pages within a block of non-volatile memory to a pseudo-physical block, wherein a number of pages in the subset of physical pages assigned to the pseudo-physical block is less than a number of physical pages within the non-volatile memory block;

wherein the assigning includes:

determine a health metric for each of the physical pages within the block of non-volatile memory; and select the subset of the physical pages for assignment to the pseudo-physical block based on the health metric; and reassign, by the controller, physical pages within the block of non-volatile memory to the pseudo-physical block upon occurrence of an event;

wherein the reassigning maintains the number of pages in the subset of physical pages assigned to the pseudo-physical block, wherein the number of pages in the subset of physical pages is fixed for at least a number of reassignments, wherein the number of pages in the subset of physical pages is changeable upon the number of reassignments being performed, and wherein the number of pages in the subset of physical pages is a same number as a number of pages in each subset of physical pages assigned to each pseudo-physical block accessed by a same controller.

19. The computer program product as recited in claim 18, comprising:

storing metadata associated with unused physical pages of the block which are not in the subset of physical pages, wherein unused physical pages of the block which are not in the subset of physical pages are reassigned to pseudo-physical blocks in one or more of the at least a number of reassignments,
wherein the metadata associated with the health metrics of the unused physical pages may be stored and later used during a reassignment operation,
wherein the selecting the subset of the physical pages is also based on an architecture of cells corresponding to the physical pages,
wherein the assigning includes:
  sorting each of the physical pages based on cells corresponding thereto,
  wherein pairs of physical pages corresponding to a same cell share a common assignment,
wherein the reassigning the physical pages includes:
  erasing metadata associated with previously unused physical pages of the block which have been assigned to the pseudo-physical block;
  storing metadata associated with unused physical pages of the block which are not assigned to the pseudo-physical block; and
  comparing the health metric of unused physical pages of the block which are not in the subset of physical pages with updated health metrics of a plurality of the physical pages assigned to the pseudo-physical block,
wherein the reassigning is performed during a garbage collection operation,
wherein data is not written to the unused physical pages.

* * * * *